United States Patent [19]

Dougherty

[11] Patent Number: 5,264,285
[45] Date of Patent: Nov. 23, 1993

[54] METHOD OF BONDING USING POLYCARBORANE SILOXANE POLYMERS

[75] Inventor: Thomas K. Dougherty, Playa Del Rey, Calif.

[73] Assignee: Hughes Aircraft Company, Los Angeles, Calif.

[21] Appl. No.: 941,833

[22] Filed: Sep. 8, 1992

Related U.S. Application Data

[63] Continuation-in-part of Ser. No. 895,061, Jun. 8, 1992.

[51] Int. Cl.$^5$ .................................................. B32B 9/00
[52] U.S. Cl. .................................. 428/427; 428/429; 428/447; 136/251; 136/256; 156/99; 156/307.5; 156/329; 528/15
[58] Field of Search ............... 156/99, 307.5, 329; 136/251, 256; 528/15; 428/447, 427, 429

[56] References Cited

U.S. PATENT DOCUMENTS 4,692,559  9/1987  Ellion et al. .................. 136/262
4,753,683  6/1988  Ellion et al. .................. 136/262

OTHER PUBLICATIONS

D. D. Stewart et al, "D$_2$-m-Carborane Siloxanes. 7. Synthesis and Properties of Ultra-High Molecular Weight Polymer", *Macromolecules*, vol. 12, No. 3, pp. 373-377 (1979).

E. Hedaya et al, "D$_2$-meta-Carborane-Siloxanes. IV. Synthesis of Linear, High Molecular Weight Polymers", *Journal of Polymer Science, Polymer Chemistry Edition*, vol. 15, pp. 2229-2238 (1977).

*Primary Examiner*—Melvyn I. Marquis
*Attorney, Agent, or Firm*—M. E. Lachman; M. W. Sales; W. K. Denson-Low

[57] ABSTRACT

A surface of one substrate is bonded to a surface of another substrate employing a low temperature vulcanizing carborane siloxane adhesive composition. The bonding method comprises: (a) forming a solution comprising (1) a polycarborane siloxane polymer having vinyl groups attached to the backbone thereof, the concentration of vinyl groups per carborane group ranging from about 3 to 30%, (2) a difunctional silane curing agent, (3) a catalyst comprising a transition metal complex, and (4) a chosen solvent; (b) applying the solution to at least one of the surfaces; (c) allowing the solvent to evaporate, forming a thin film of the adhesive on the surface; (d) bringing the surfaces of the substrates into contact; and (e) bonding the surfaces of the substrates together by application of heat and, optionally, pressure. Optionally, the coated part(s) may be stored at a low temperature for a long period of time prior to the bonding process. This invention is particularly useful for bonding a solar cell cover to a solar cell or for bonding solar cells to an underlying substrate.

25 Claims, No Drawings

5,264,285

METHOD OF BONDING USING POLYCARBORANE SILOXANE POLYMERS

This invention was made with United States Government support under Contract No. F33615-86-C-5081 awarded by the Department of the Air Force. The United States Government has certain rights in this invention.

CROSS-REFERENCE TO RELATED APPLICATIONS

The present application is a continuation-in-part of application Ser. No. 07/895,061, filed Jun. 8, 1992.

BACKGROUND OF THE INVENTION

1. Field of the Invention

The present invention relates, in general, to the adhesive bonding of two surfaces together, and, more particularly, to a process for bonding a solar cell cover glass to a solar cell, and for bonding solar cells to an underlying substrate.

2. Description of Related Art

Materials which are used in a space environment must be able to withstand extreme conditions, such as exposure to temperatures from about $-70°$ to $+120°$ C. for extended periods of time, such as ten years, and exposure to vacuum conditions in space. In addition, materials in space are exposed to high energy ultraviolet radiation, high energy protons, and high energy electrons, all of which can produce significant damage.

In the case of solar cells used in space, a cover glass, usually formed of silica, is bonded to the front of each cell to protect the photovoltaic junction from radiation and particle damage. The cover glass also acts as a thermal control link to allow the solar cells to operate at lower temperatures. However, even with such a glass cover, high energy electron damage does occur. It has been found that the effect of electron radiation can be minimized if the cells are run at higher temperatures or periodically cycled to higher temperatures. In the case of silicon solar cells, electron damage can be annealed and the cell efficiency optimized by heating the cells to about 60° to 100° C. At these temperatures, known adhesives used to bond the cover glass to the solar cell, such as dimethyl silicone resins, are sufficient.

However, solar cells based on gallium arsenide semiconductor technology are currently being developed which have a much higher efficiency than silicon solar cells at increased temperatures. In order to anneal the gallium arsenide cells for electron damage, a temperature in the range of about 250° to 350° C. is required.

Commercially available adhesive systems which are currently used in space hardware environments include DC-93-500, a liquid two-part room temperature vulcanizing dimethyl silicone resin available from Dow Corning, which is used for bonding of cover glasses to solar cells. This two-part liquid is mixed, and then within one hour, the liquid must be placed between the substrates and the bond formed between the cover glass and the solar cell.

In the bonding of solar cells and other parts to the underlying spacecraft, a filled liquid rubber, such as RTV 566 or RTV 567, available from General Electric Company, is used.

While these commercially available materials allow thermal excursion of the bondlines to between 200° C. and 300° C., a need remains for an adhesive that can withstand annealing temperatures up to at least 350° C. and which has the advantage of low temperature vulcanizing.

The cost, inconvenience, and hazardous waste generated by the bonding of cover glasses to solar cells and the bonding of solar cells to supporting substrates with a liquid rubber having a short shelf life are considerable. Accordingly, a new bonding process is desired.

One material that has been previously studied for its thermal stability is a class of ultra-high molecular weight carborane siloxane polymers, as described by D. D. Stewart et al in "D2-m-Carborane Siloxanes. 7. Synthesis and Properties of Ultra-High Molecular Weight Polymer", *Macromolecules*, Vol. 12, No. 3, pp. 373–377 (May–June 1979). In the method of Stewart et al, the carborane siloxane polymers are formed by:

(1) forming a slurry of carborane bisdimethyl silanol in dried chlorobenzene and cooling the slurry to $-10°\pm5°$ C.;

(2) adding to the slurry a mixture of dimethylbisureido silane and methylphenylbisureido silane to form a reaction mixture at $-10°\pm5°$ C.;

(3) separating from the reaction mixture a silanol end-capped prepolymer of the polycarborane siloxane polymer;

(4) dissolving the prepolymer in chlorobenzene to form a solution; and (5) adding to the prepolymer solution an excess of the above-noted bisureido silanes.

Stewart et al reported that the polymers so formed had molecular weights in excess of $10^6$, which was believed to be due to the technique of the reverse addition of the bisureido silanes to the carborane disilanol in chlorobenzene. However, as disclosed by Stewart et al at page 375, right column, first and second full paragraphs, consistent and reliable results were not achieved. One problem was that a reliable technique for purifying the polymer was not found, and consequently the prepolymer was degraded by reaction with amine by-products. Another problem was that many of the prepolymer samples were not capable of being advanced to the high molecular weight polymers, and no cause for this difficulty was defined. In addition, attempts to replicate the experiments of Stewart et al did not result in polymers of the highest molecular weight reported by Stewart et al. As discussed by Stewart et al, optimum mechanical and thermal properties of these polymers occur only at high molecular weights.

Since the carborane siloxane polymers of Stewart et al at high molecular weight have desirable high temperature properties and could be useful in a space environment, the present inventor developed methods of reproducibly forming a very high molecular weight polycarborane siloxane polymer. These methods are disclosed and claimed in copending application Ser. No. 07/807,364, filed Dec. 16, 1991, now U.S. Pat. No. 5,208,310 and Ser. No. 07/895,061, filed Jun. 8, 1992, and assigned to the same assignee as the present application.

While the new methods result in a considerably improved polymer over Stewart et al, the base polymer lacks the required mechanical integrity at high temperature to allow its use in adhesive bonds for space-stable structures. Thus, it is desired to provide improved high temperature stability compared to the base polymer. It is especially desired to use the improved polymer to adhere one substrate to another, such as solar cell cover glasses to solar cells or solar cells to underlying substrates.

SUMMARY OF THE INVENTION

In accordance with the invention, a surface of a first substrate is bonded to a surface of a second substrate employing a low temperature vulcanizing carborane siloxane adhesive composition. The bonding method comprises:

(a) forming a solution comprising (1) a polycarborane siloxane polymer having vinyl groups attached to the backbone thereof, the concentration of vinyl groups per carborane group ranging from about 3 to 30%, (2) a difunctional silane curing agent, (3) a catalyst comprising a transition metal complex, and (4) a chosen solvent;

(b) applying the solution to at least one of the surfaces;

(c) allowing the solvent to evaporate, forming a thin film of the adhesive on the surface;

(d) bringing the surfaces of the substrates into contact; and (e) bonding the surfaces of the substrates together by application of heat and, optionally, pressure.

Optionally, the coated part(s) may be stored at a low temperature for a long period of time prior to the bonding process.

Thus, this invention allows for the production of long storage life parts that can be bonded at any convenient time. The operator applying the adhesive does not have to be experienced with the formulation of a liquid rubber. There is more efficient use of materials and labor and easier alignment of the part because of these aspects of the invention.

DESCRIPTION OF THE PREFERRED EMBODIMENTS

High molecular weight polycarborane siloxane polymers are provided by employing ultra-pure reactants, as described in copending application Ser. No. 07/807,364. In particular, carborane bisdimethyl silanol, dimethylbisureido silane (also known as bis(N-phenyl-N'-pyrrolidinyl)dimethylsilane), and methylphenylbisureido silane (also known as bis(N-phenyl-N'-pyrrolidinyl)methylphenylsilane) are each purified by a series of recrystallization procedures in specific solvents.

The reactants are as follows:

(1) carborane bisdimethyl silanol of the following formula:

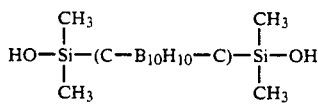

where —(C—B$_{10}$H$_{10}$—C)— represents the carbonate moiety, (2) dimethylbisureido silane of the following formula:

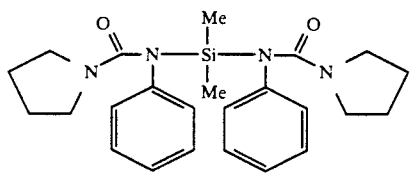

where Me represents the methyl group.

(3) methylphenylbisureido silane of the following formula:

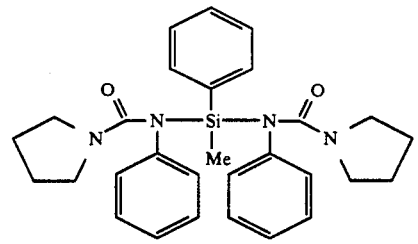

Carbonate bisdimethyl silanol is purified by successive crystallizations from hexane/toluene. After successive recrystallizations have been completed, the white crystalline product is dried at elevated temperature in vacuo and then stored for further use in a dry box.

Specifically, carborane bisdimethyl silanol is purified by dissolution thereof in a dry, oxygen-free mixture of hexane and toluene by heating to about 70° C. in an inert atmosphere to form a solution, filtering the solution, and cooling the solution to form a crystallization product. The dissolution, filtering, and cooling are repeated for a total of two to five additional times.

Bis(N-phenyl-N'-pyrrolidinyl)dimethylsilane is also purified by successive recrystallizations. In this case, the preferred solvent system for recrystallization is diisopropyl ether/tetrahydrofuran.

Specifically, dimethylbisureido silane is purified by dissolution thereof in a dry, oxygen-free mixture of diisopropyl ether and tetrahydrofuran by heating to about 60° C. in an inert atmosphere to form a solution, filtering the solution, and cooling the solution to form a crystallization product. The dissolution, filtering, and cooling are repeated once.

Bis(N-phenyl-N'-pyrrolidinyl)methylphenylsilane is also purified by successive recrystallizations. In this case, the preferred solvent system for recrystallization is diisopropyl ether/hexane.

Specifically, methylphenylbisureido silane is purified by dissolution thereof in dry, oxygen-free diisopropyl ether to form a solution, heating the solution to 60° to 80° C., filtering the solution, adding dry hexane to the filtered solution to form a mixture, and cooling the mixture to room temperature to form a crystalline product. The dissolution, filtering, and cooling are repeated two additional times.

After purification, the above-noted reactants are reacted to first form a prepolymer, or silanol end-capped low molecular weight oligomer of polycarborane siloxane, and to then advance the molecular weight of the prepolymer. While the details of the reaction are given in the above-mentioned copending application Ser. No. 07/807,364, the reaction sequence, briefly, comprises the steps of (1) providing ultra-pure carboranebisdimethyl silanol in dried chlorobenzene solvent to form a slurry, and cooling the slurry to $-10° \pm 5°$ C.;

(2) adding to the slurry a mixture of ultra-pure dimethylbisureido silane and ultra-pure methylphenylbisureido silane to form a reaction mixture at $-10° \pm 5°$ C.;

(3) separating from the reaction mixture a silanol end-capped prepolymer of the polycarborane siloxane polymer;

(4) dissolving the prepolymer in chlorobenzene to form a solution; and (5) adding to the prepolymer solution an excess of the bisureido silane selected from the group consisting of dimethylbisureido silane, methylphenylbisureido silane, and a mixture thereof, to form the very high molecular weight polycarborane siloxane polymer. Molecular weights may range from about 120,000 to 175,000, considerably in excess of prior art methods of forming this polymer, which typically result in molecular weights of 14,000 to 47,000.

Even higher molecular weights may be obtained by performing Step (5) at a temperature in the range of 60° to 70° C. The resulting polymer has a molecular weight of about 600,000.

Alternative to the above-described two-step process is a one-step process, in which after the first addition of the bisureido silane reactants to the carboranebisdimethyl silanol in Step (2) is completed, the reaction mixture is held at a temperature in the range of −15° to −20° C. for about 6 to 20 hours. Thus, Steps (3) through (5) are eliminated. The resulting polymer has a molecular weight of about 400,000.

In the practice of the present invention, a high molecular weight carborane siloxane polymer, as described above, is employed, with the following modification: a vinyl group is substituted in the backbone of the polymer. This vinyl group allows, when properly formulated with the curing agent and catalyst described below, low temperature vulcanization of the adhesive. The adhesive of the invention, after proper formulation and processing, forms low modulus adhesive bonds of greater mechanical and thermal stability than previously available from any other material.

The substitution of the vinyl group on the backbone of the polymer is accomplished by adding to the mixture in step (2) the compound vinylmethyl bisureido silane monomer, of the following formula:

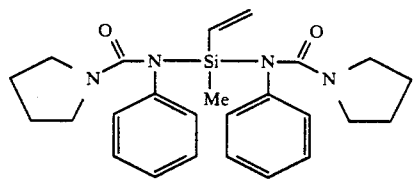

where the double bond represents the vinyl group. The vinylmethyl bisureido silane is purified in the same manner as methylphenylbisureido silane, above.

The modified mixture containing the three silanes is then added to the slurry, as in step (2), to form the reaction mixture. Step (5) may optionally be suitably modified to include an excess of the mixture of the vinylmethylbisireido silane with both of the listed bisureido silanes.

As in application Ser. No. 07/807,364, step (5), as modified, may be performed at a temperature within the range of about 60° to 70° C. Alternatively, the one-step approach, namely, after step (2) of holding the reaction mixture at a temperature in the range of about −15° to −20° C. for about 6 to 20 hours, may be utilized.

In the preparation of the vinyl-substituted polymer, the concentration of vinyl groups per carborane group ranges from about 3 to 30%, with 100% being defined as one vinyl group per one carborane group. Less than about 3% does not provide a sufficiently high crosslink density, and the cured material would not have sufficient mechanical strength and would be tacky at elevated temperatures. Greater than about 30% provides a crosslink density that is too high to be useful as an adhesive, as the cured material would be too brittle and would cure too fast. Preferably, the polymer contains about 5% vinyl groups; this concentration affords a sufficient flow of the material prior to cure and provides a cured material having the desired mechanical properties.

The polymer has the formula shown below

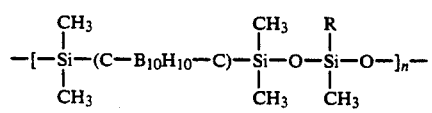

where R is one of methyl, phenyl, and vinyl. The ratio of methyl to phenyl in the polymer is preferably about 2:1, since this affords a polymer having a melting point at the appropriate temperature for low temperature vulcanizing. A much higher ratio, representing a high methyl content, results in a melting point that is too high, while a much lower ratio, representing a high phenyl content, results in a decrease in thermal stability of the polymer. Preferably, R is about 63% methyl, about 32% phenyl, and about 5% vinyl.

Low temperature vulcanizing films of the vinyl-containing polymer are prepared by mixing the polymer with a silane-containing curing agent and a catalyst in a suitable solvent. The solution is cast into a liquid film. Upon evaporation of the solvent, a solid adhesive film is formed that may be used to bond similar and dissimilar surfaces together by the application of heat and, optionally, pressure.

The silane-containing curing agent is a difunctional silane. The term "silane-containing" is used herein to mean a compound containing the group

More preferably, the curing agent contains at least one carborane group for thermal stability and compatibility with the polymer. Examples of preferred curing agents include m-carboranebis(2-hydridotetramethyldisiloxane), m-carboranebis(3-hydridohexamethyltrisiloxane), and carborane bisdimethyl silane. m-Carboranebis(2-hydridotetramethyldisiloxane) has the formula

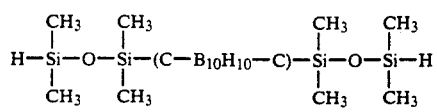

while m-carboranebis(3-hydridohexamethyltrisiloxane) has the formula

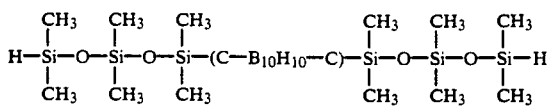

Other possible curing agents include tetramethyldisiloxane and polymeric or cyclic methylhydrosiloxanes. The preferred curing agent is the carborane-containing curing agent described, carboranebis(2-hydridotetramethyldisiloxane.

The above carborane-containing disilane known as m-carboranebis(3-hydridohexamethyltrisiloxane) was synthesized during the preparation of the adhesive of the invention. This trisiloxane compound, which is considered to be novel, is prepared by reacting dimethylbisureidosilane with m-carboranebisdimethyldisilanol in solution. An excess of the former compound is employed with respect to the latter compound. After the reaction is complete, water is added to hydrolyze all ureido moieties. Any by-products are removed and the remaining contents are dried to remove water. To the dehydrated solution is added an excess of the end-capping reagent, dimethylureido silane, which yields the novel trisiloxane.

The molar ratio of silane groups in the silane-containing curing agent to the number of vinyl groups is slightly less than one; preferably, the ratio is about 85 to 95%. A slight molar excess of polymer bond vinyl groups assures complete reaction of the disilane compound. If complete reaction does not occur, the unreacted disilane compounds may contribute to undesired outgassing at elevated temperature.

The catalyst is one known to catalyze hydrosilation to vinyl groups. Such catalysts typically include platinum, palladium, or rhodium.

The platinum catalysts are desirably employed in preparing the adhesive film of the invention. Chloroplatinic acid ($H_2PtCl_6$) solutions can be utilized in these systems. Transition metal vinyl complexes can also be utilized for this reaction. Examples of these are platinum(0) divinyl complexes, such as platinum divinyltetramethyldisiloxane complex, platinum bistriphenylphosphine ethylene complex, and platinum cyclovinylmethylsiloxane complex (preferred for use in the practice of the invention as a "slower" catalyst), platinum(2) vinyl complexes, such as the bisethene complex of platinum dichloride, and the like. Other examples of useful catalysts include tetrakis triphenylphosphine palladium and certain rhodium complexes, such as tris(triphenylphosphine) rhodium chloride. The preferred catalyst comprises platinum cyclovinyl siloxane, which allows adhesive flow of the melted film before cure.

The amount of catalyst employed ranges from about 5 to 75 parts per million (ppm) of metal, based on the amount of the polymer.

In a first embodiment, the cured adhesive is conveniently prepared in film form, as discussed above. Films of the adhesive are placed between the surfaces of two substrates to be bonded together. Application of heat and, optionally, pressure for a period of time results in a strong mechanical bond between the two substrates that can withstand thermal cycling to at least about 600° C.

The temperature employed in the bonding is considered to be moderate, within the range of about 100° to 140° C.

The amount of pressure, if employed, is that sufficient to promote bonding, typically about 5 to 50 pounds per square inch (about 351 to 3,515 grams per square centimeter), and is preferably about 20 pounds per square inch (about 1,400 grams per square centimeter). Although the use of pressure is not required in the practice of the invention, it is preferably employed.

The time of curing at the foregoing temperatures and pressures is about 4 to 24 hours, and provides for melting, flow, and subsequent cure of the adhesive.

In a second embodiment, it has been found particularly advantageous to use the adhesive disclosed to coat one of the substrates and bond the coated substrate to another substrate at a later time. For example, in the case of bonding a solar cell cover glass to a solar cell, the adhesive can be coated onto either part. The coated substrate appears to be a rubber-coated part. This part is easy to handle and can be stored for long periods at the proper conditions. After storage, this "ready-to-bond" part is placed on the "to-be-bonded substrate", and with the application of heat and pressure, as described above, the bond is formed.

In this second embodiment, the solution formed from the carborane base polymer, the carborane-containing curing agent, catalyst, and solvent is mixed well and degassed. This solution is then applied to one or both of the substrates to be bonded. After evaporation of the solvent, one is left with the substrate onto which has been coated a layer of hard rubber. This layer is solid at room temperature and melts at the temperature required for bonding, such as 125° C. for bonding solar cell components. Thus, the coating of the present invention is not sticky until heated. It is these unique properties of this rubber that make the invention so special. The hard rubber-coated substrates can be bonded by the application of heat and pressure, as described above. Or, the hard rubber-coated substrates can be stored for several weeks or months before adhesive bonding. In addition, the solution can be stored for several months at low temperature before substrate application.

The hard rubber-coated substrates may be stored for at least three months at a temperature not exceeding about −10° C., without deleterious effect on the properties of the cured adhesive.

Solvents useful in the method of the invention include single-ring aromatic compounds, halogenated aliphatic compounds, and halogenated single-ring aromatic compounds. Examples of preferred solvents include chlorobenzene, benzene, toluene, and chloroform.

Thus, this invention allows for the production of long storage life parts that can be bonded at the convenience of the processor. The operator applying the adhesive does not have to be experienced with the formulation of a liquid rubber. There is more efficient use of materials and labor and easier alignment of the part because of these aspects of the invention.

EXAMPLES

Example 1

This example describes the formation of a vinyl-containing carborane siloxane base polymer. The number of vinyl groups was about 10%.

The polymer was synthesized according to the two-step polymerization procedure outlined above. It was necessary to synthesize and purify an additional ureido monomer, vinylmethylbisureido silane monomer. This monomer was purified by recrystallization from a diisopropylether/hexane solvent system in a manner identical with the purification of phenylmethylbisureido silane described in copending application Ser. No. 07/807,364. The purified reagents were then reacted as follows:

Carboranedisilanol (20.4 g) was placed in a three-neck 250 mL round bottomed flask. The flask was equipped with a septum, mechanical stirrer, and a solid addition funnel charged with methylphenylbisureido silane (10.01 g), dimethylbisureido silane (17.6 g), and methylvinylbisureido silane (3.0 g). The flask was cooled to −15° C., during which time chlorobenzene (21 mL) was added to the flask. After allowing the flask to cool to bath temperature, the three ureido monomers were added as a mixture of solids in several portions. The addition lasted approximately two hours. The flask was cooled an additional two hours, with stirring. The ice bath was removed and the reaction mixture was stirred overnight. The next day, the reaction mixture was diluted in chlorobenzene (100 mL) and poured through a sintered glass funnel (to remove the insoluble by-product) into stirred methanol. The precipitated polymer (20.2 g, 83% of theoretical yield) was dried in vacuo.

The dried prepolymer was then advanced to higher molecular weight as previously described herein for the prepolymer in copending application Ser. No. 07/807,364. The polymer so obtained was used in the formulation of thin film adhesives which are the subject of the present invention.

Example 2

This example describes the formation of a vinyl-containing carborane siloxane base polymer as in Example 1, but wherein the number of vinyl groups was about 5%.

Carboranedisilanol (20.4 g, 0.070 mol) was placed in a three-neck 250 mL round bottomed flask. The flask was equipped with a septum, mechanical stirrer., and a solid addition funnel charged with dimethylbisureido silane (18.53 g, 0.042 mol), methylphenylbisureido silane (10.58 g, 0.02 mol), and methylvinylbisureido silane (1.5 g, 0.0033 mol).

The flask was cooled to −15° C., during which time chlorobenzene (21 mL) was added to the flask. After allowing the flask to cool to bath temperature, the three ureido monomers were added as a mixture of solids in several portions. The addition lasted approximately 2 hours. The flask was cooled an additional 2 hours with stirring. The ice bath was removed and the reaction mixture was stirred overnight. The next day, the reaction mixture was diluted in chlorobenzene (100 mL) and poured through a sintered glass funnel (to remove the insoluble by-product) into stirred methanol. The precipitated polymer (20.2 g, 83% of theoretical yield) was dried in vacuo. A sample of the polymer was analyzed by size exclusion chromatography (SEC) and/or dilute solution viscosity measurements to determine molecular weight.

The polymer was then advanced in molecular weight as previously described. Only one of the three ureidos is required in the advancement, although the dimethyl was conveniently employed. Further, a mixture of the ureidos would work as well.

EXAMPLE 3

This example describes the synthesis of a silane-containing carborane curing agent, m-carboranebis(2-hydridotetramethyldisiloxane).

In order to synthesize the silane curing agent, an additional ureido monomer, dimethyl ureido silane, was synthesized in a two-step procedure from dimethylchloro silane as described for other ureido reagents by Stewart et al.

The dimethylureido silane had the following spectral properties:

$^1$H-NMR (CDCl$_3$): 7.5–7.1 (m, 5H), 4.72 (m, 1H), 3.09 (m, 4H), 1.90 (m, 4H), 0.55 (d, 6H);

$^{13}$C-NMR (CDCl$_3$): 160.66, 142.71, 128.84, 127.92, 124.98, 47.52, 25.17, −1.74.

The foregoing values are consistent with the assigned structure.

Carborane disilanol (6.0 g, 0.02 mole) was dissolved in dry ethylether (100 mL). The ureido end-capping reagent dimethyl ureido silane (12.0 g, 0.048 mole) was dissolved in ethylether (75 mL) and tetrahydrofuran (25 mL). The ureido solution was added to the carborane disilanol over one hour at room temperature. The reaction mixture was stirred overnight. The next day, water (5 mL) was added to the reaction mixture and the slurry was filtered and dried (over Na$_2$SO$_4$). The clear solution was evaporated and the residue was distilled to give a fraction boiling 90°–95° C./−0.1 torr (4.1 g, 48% of theoretical yield, 99+% pure by gas chromatography).

$^1$H-NMR (CDCl$_3$): 4.70 (septet, 2H, J=2.8 Hz), 0.18 (d, 12H, J=2.8 Hz), 0.17 (s, 12H);

$^{13}$C-NMR (CDCl$_3$): 66.48, 0.61, 0.24;

$^{29}$Si-NMR (CDCl$_3$) 0.866 (brd m), −4.25 (d of septets,

J(Si,H)=206.9 Hz, J(Si,CH$_3$)=7.0 Hz);

IR (neat): 2958, 2596, 2129, 1258, 1084, 910.4 cm$^{-1}$.

This liquid compound was used as the silane-containing curing agent in the formulating of adhesive films described below.

Example 4

This example describes the synthesis of a silane-containing carborane curing agent, m-carboranebis(3-hydridohexamethyltrisiloxane).

Dimethylbisureido silane (14.7 g, 0.04 mol) was dissolved in chlorobenzene (150 mL) and cooled to −20° C. To this was added over a period of 3 hours m-carboranebisdimethyldisilanol (4.9 g, 0.0017 mol). The reaction mixture was allowed to stir one hour and then water (5 mL) was added. Stirring was continued one additional hour, then the reaction mixture was filtered and dried over sodium sulfate. The dried solution was taken into the dry box and the endcapping reagent, dimethylureido silane, was added (10 g, large excess) over 1 hour. Stirring was continued overnight. The next day, the solution was removed from the dry box and worked up by adding water (5 mL) and stirring for 1 hour. The heterogeneous solution was filtered, concentrated, and chromatographed (silica gel with hexane eluent) to give the product (2.0 g, 30% of theoretical yield) as a colorless mobile liquid.

$^1$H-NMR (CDCl$_3$): 4.69 (septet, 2H, J=2.7 Hz), 0.19 (s, 12H), 0.18 (d, 12H, J=2.7 Hz), 0.06 (s, 12H);

$^{13}$C-NMR (CDCl$_3$): 68.43, 0.78, 0.68, 0.43;

$^{29}$Si-NMR (CDCl$_3$): −0.84 (brd m), −6.57 (d of septets, J=204.0, 7.2 Hz), −18.42 (septet, J=7.4 Hz);

IR (neat) 2962, 2596, 2126, 1261, 1088, 1057, 910, 857, 826, 798 cm$^{-1}$.

Example 5

This example is directed to the formation of low temperature vulcanizing films of carborane base polymer, carborane silane containing curing agent, and a platinum catalyst.

A mixture of carborane base polymer from Example 1 (2.00 g, 0.00055 mole vinyl group), silane curing agent from Example 3 (0.075 g, 0.00035 mole silane Si-H functionality), and platinum cyclovinyl siloxane catalyst known to catalyze hydrosilation reactions (0.006 g, 30 ppm platinum in dried film) and chlorobenzene (2 g) were mixed well to dissolve all components. The viscous solution was degassed in a vacuum atmosphere to remove entrapped air. The solution was then laid out into a thin layer of solution on a polytetrafluorocarbon plate. The solvent was slowly evaporated in air for one hour and then in vacuo for four hours to remove solvent. The thin film thus obtained is suitable for adhesive bonding of substrates, as discussed below in Examples 6 and 7.

Example 6

This example demonstrates adhesive bonding of substrates, employing the adhesive of the invention.

The adhesive film formed in Example 5 was placed between the two substrates to be bonded, for example, solar cell to cover glass. Application of heat (100° to 140° C.) and pressure (5 to 50 pounds per square inch, about 351 to 3,515 grams per square centimeter) over a 4 to 24 hour period provides for melting and subsequent cure of the adhesive. The following mechanical tests were performed on (1) the adhesive ("with invention"), (2) identical films made from the base polymer but not containing the curing agent or catalyst ("without invention"), and (3) the commercially available adhesive, DC-93-500. Lap shear strength was measured at room temperature, 200° C., and 300° C. The are tabulated in the Table below.

TABLE

| Lap Shear Strength as a Function of Temperature. | | | |
|---|---|---|---|
| Temperature of Test. °C. | Lap Shear Strength, psi | | |
| | With Invention | Without Invention | DC93500 |
| 25 | 110 | 110 | 130 |
| 200 | 40 | 0 | 0 |
| 300 | 40 | 0 | 0 |

The Table shows that the adhesive of the invention has the desired mechanical strength up to at least 300° C. (the highest temperature attainable in the test instrument). In addition, the present adhesive has been shown to survive short excursions to 600° C.

Example 7

A mixture of carborane base polymer (1.14 9, 0.00016 mole vinyl group), silane curing agent [0.023 9, 0.0010 mole silane Si-H functionality), platinum cyclovinyl siloxane curing agent known to catalyze hydrosilation reactions (0.0007 g, 18 ppm platinum in dried film, available from Petrarch Systems under the trade designation PC085, CAS No. 68585-32-00), and chlorobenzene (2 g) were mixed well to dissolve all components. The viscous solution was degassed in a vacuum atmosphere to remove entrapped air. The solution was then stored in a freezer at −10° C. for two weeks. The solution was removed from the freezer, warmed to room temperature, and a 5 mil (0.0127 cm) thick film of this solution was coated onto 9 mil (0.0229 cm) thick fused silica solar cell covers. The solution was laid out in such a way that the backside (the solar cell side) of the cover was coated with the solution. The coated cover was then placed in vacuum for two hours. The resulting part was a rubber-coated solar cell cover. The rubber coating was applied only on the backside of the cover.

The rubber-coated solar cell cover described above was then stored in the freezer at about −10° C. for two weeks. The coated cover was then removed from the freezer, warmed to room temperature, and placed on top of a solar cell, such that the rubber-coated side was in contact with the solar cell. The assembly thus formed was bonded by the application of heat (100° to 140° C.) and pressure (5 to 50 psi, or about 351 to 3,515 grams per square centimeter) to give a bonded solar cell to cover assembly.

Thus, there has been disclosed a process for bonding two materials together. It will be readily appreciated by those skilled in this art that various changes and modifications of an obvious nature may be made without departing from the scope of the invention, as defined by the appended claims.

What is claimed is:

1. A method of bonding a surface of a first substrate to a surface of a second substrate employing a low temperature vulcanizing carborane siloxane adhesive composition comprising:

(a) forming a solution comprising (1) a polycarborane siloxane polymer having vinyl groups attached to the backbone thereof, the concentration of vinyl groups per carborane group ranging from about 3 to 30%, (2) a silane curing agent comprising two terminal —SiH groups, (3) a hydrosilation catalyst comprising a complex of platinum, palladium, or rhodium, and (4) a solvent for said polymer, said curing agent and said catalyst;

(b) applying said solution to at least one of said surfaces;

(c) allowing said solvent to evaporate, forming a film of said adhesive on said at least one of said surfaces;

(d) bringing said surfaces of said substrates into contact; and (e) bonding said surfaces of said substrates together by application of heat.

2. The method of claim 1 wherein said concentration of said vinyl groups per carbonate group is about 5%.

3. The method of claim 1 wherein said catalyst is selected from the group consisting of chloroplatinic acid, tetrakis triphenylphosphine palladium, and rhodium complexes.

4. The method of claim 3 wherein said transition metal complexes are selected from the group consisting of platinum divinyltetramethyldisiloxane complex, platinum bistriphenylphosphine ethylene complex, platinum cyclovinylmethylsilsiloxane complex, and the bis ethene complex of platinum dichloride.

5. The method of claim 1 wherein said catalyst is present in an amount to provide about 5 to 75 parts per million of said metal in said polymer.

6. The method of claim 1 wherein said curing agent is selected from the group consisting of diphenyl silane, m-carboranebis(2-hydridotetramethyldisiloxane), m-carboranebis(3-hydridohexamethyltrisiloxane), carborane bisdimethyl silane, tetramethyldisiloxane, polymeric methylhydrosiloxanes, and cyclic methylhydrosiloxanes.

7. The method of claim 1 wherein the molar ratio of silane groups of said silane curing agent to said polymer is about 85 to 95% of the number of said vinyl groups.

8. The method of claim 1 wherein said solvent is selected from the group consisting of (a) single-ring aromatic compounds, (b) halogenated aliphatic compounds, and (c) halogenated single-ring aromatic compounds.

9. The method of claim 8 wherein said solvent is selected from the group consisting of chlorobenzene, benzene, toluene, and chloroform.

10. The method of claim 1 wherein said bonding is performed at a temperature within the range of about 100° to 140° C.

11. The method of claim 1 wherein said surfaces of said substrates are bonded together by application of pressure in addition to application of said heat.

12. The method of claim 11 wherein said bonding is performed using an amount of pressure that ranges from about 5 to 50 pounds per square inch or about 351 to 3,515 grams per square centimeter.

13. The method of claim 1 wherein said bonding is carried out for a period of time ranging from about 4 to 24 hours.

14. The method of claim 1 wherein said surface coated with said film of adhesive is stored for a period of time at a temperature below room temperature prior to bonding said surfaces together.

15. The method of claim 14 wherein said surface coated with said film of adhesive is stored at a temperature not exceeding about −10° C.

16. The method of claim 1 wherein said first substrate comprises a solar cell and said second substrate comprises a solar cell cover wherein said solution is applied to one surface of said solar cell cover.

17. In combination, a substrate having a surface provided with a film of a low temperature vulcanizing carborane siloxane adhesive composition comprising:
(a) a polycarborane siloxane polymer having vinyl groups attached to the backbone thereof, the concentration of vinyl groups per carborane group ranging from about 3 to 30%;
(b) a silane curing agent comprising two terminal —SiH groups; and
(c) a hydrosilation catalyst comprising a complex of platinum, palladium, or rhodium.

18. The combination of claim 17 wherein said concentration of vinyl groups is about 5%.

19. The combination of claim 17 wherein said catalyst is selected from the group consisting of chloroplatinic acid, tetrakis triphenylphosphine palladium, and rhodium complexes.

20. The combination of claim 19 wherein said transition metal complexes are selected from the group consisting of platinum divinyltetramethyldisiloxane complex, platinum bistriphenylphosphine ethylene complex, platinum cyclovinylmethylsiloxane complex, and the bis ethene complex of platinum dichloride.

21. The combination of claim 17 wherein said catalyst is present in an amount to provide about 5 to 75 parts per million of said metal in said polymer.

22. The combination of claim 17 wherein said curing agent is selected from the group consisting of diphenyl silane, m-carboranebis(2-hydridotetramethyldisiloxane), m-carboranebis(3-hydridohexamethyltrisiloxane), carborane bisdimethyl silane, tetramethyldisiloxane, polymeric methylhydrosiloxanes, and cyclic methylhydrosiloxanes.

23. The combination of claim 17 wherein the molar ratio of silane groups of said silane curing agent to said polymer is about 85 to 95% of the number of said vinyl groups.

24. The combination of claim 17 wherein said substrate comprises a solar cell or a solar cell cover.

25. A method of bonding a surface of a first substrate to a surface of a second substrate employing a low temperature vulcanizing carborane siloxane adhesive composition comprising:
(a) forming a solution comprising (1) a polycarborane siloxane polymer having vinyl groups attached to the backbone thereof, the concentration of vinyl groups per carborane group ranging from about 3 to 30%, (2) a silane curing agent comprising two terminal —SiH groups, (3) a hydrosilation catalyst comprising a complex of platinum, palladium, or rhodium, and (4) a solvent for said polymer, said curing agent and said catalyst;
(b) providing a third substrate;
(c) applying said solution to the surface of said third substrate;
(d) allowing said solvent to evaporate, forming a film of said adhesive on said surface of said third substrate;
(e) removing said film from said surface of said third substrate;
(f) bringing said surfaces of said first and second substrates into contact with opposite sides of said film;
(g) bonding said surfaces of said substrates together by application of heat.

* * * * *